United States Patent
Uchiyama et al.

[11] Patent Number: 6,099,731
[45] Date of Patent: Aug. 8, 2000

[54] METHOD AND APPARATUS FOR TREATING WATER

[75] Inventors: Hiroo Uchiyama; Osami Yagi, both of Ibaraki-ken; Masayoshi Kitagawa, Kanagawa-ken; Tatsuo Shimomura, Kanagawa-ken; Takeshi Hasegawa, Kanagawa-ken, all of Japan

[73] Assignees: Ebara Research Co., Ltd., Fujisawa; Japan as represented by Director General of Agency of National Institute for Environmental Studies, Tsukaba, both of Japan

[21] Appl. No.: 09/147,013

[22] PCT Filed: Mar. 10, 1997

[86] PCT No.: PCT/JP97/00737

§ 371 Date: Sep. 11, 1998

§ 102(e) Date: Sep. 11, 1998

[87] PCT Pub. No.: WO97/33836

PCT Pub. Date: Sep. 18, 1997

[30] Foreign Application Priority Data

Mar. 12, 1996 [JP] Japan ................................ 8-054973

[51] Int. Cl.$^7$ ........................................................ C02F 3/02
[52] U.S. Cl. .................... 210/603; 210/610; 210/625; 210/626; 210/195.2; 210/195.3; 210/202
[58] Field of Search ................................ 210/603, 610, 210/611, 625, 626, 151, 195.2, 195.3, 202, 220, 257.2

[56] References Cited

U.S. PATENT DOCUMENTS

| | | |
|---|---|---|
| 2,658,034 | 11/1953 | Hood . |
| 3,557,954 | 1/1971 | Welch .................................... 210/151 |
| 4,705,633 | 11/1987 | Bogusch ................................. 210/610 |
| 5,037,551 | 8/1991 | Barkley et al. ........................ 210/610 |
| 5,057,221 | 10/1991 | Bryant et al. ......................... 210/610 |
| 5,151,187 | 9/1992 | Behmann ............................ 210/195.2 |
| 5,196,121 | 3/1993 | Moore et al. .......................... 210/610 |
| 5,254,253 | 10/1993 | Behmann ............................ 210/195.2 |
| 5,302,286 | 4/1994 | Semprini et al. ....................... 210/610 |
| 5,384,048 | 1/1995 | Hazen et al. ............................ 210/610 |
| 5,868,934 | 2/1999 | Yamasaki et al. .................... 210/195.2 |

FOREIGN PATENT DOCUMENTS

| | | |
|---|---|---|
| 49-65055 | 6/1974 | Japan . |
| 1-207197 | 8/1989 | Japan . |
| 3-292970 | 12/1991 | Japan . |
| 5-305294 | 11/1993 | Japan . |
| WO 90/15028 | 12/1990 | WIPO . |

OTHER PUBLICATIONS

S.E. Herbes, et al. "Innovative Bioreactor Development for Methanotrophic Biodegradation of Trichloroethylene", Jan. (1994), pp. iii–xvii and 1–105.

Hiroo Uchiyama, et al., "Areobic Degradation of Trichloroethylene by a New Type II Methane–Utilizing Bacterium, Strain M", Chem. 53, Apr. 28, 1989, pp. 2903–2907.

Hiroo Uchiyama, et al., Aerobic Degradation of Trichloroethylene at High Concentration by a Methane–Utilizing Mixed Culture, Chem. 53, Oct. 20, 1988, pp. 1019–1024.

Gregory A. Brusseau, et al., "Optimization of trichloroethylene oxidation by methanotrophs and the use of a colorimetric assay to detect soluble methane monooxygenase activity", Jun. 21, 1990, pp. 19–29.

*Primary Examiner*—Christopher Upton
*Attorney, Agent, or Firm*—Oblon, Spivak, McClelland, Maier & Neustadt, P.C.

[57] ABSTRACT

A process for treating a water containing chlorinated organic compounds, wherein a microorganism is introduced from a degradation tank to a separation tank and an energy source is supplied to the microorganism separated in the separation tank. A water-treatment apparatus having a structure capable of continuously introducing water to be treated through a degradation tank, a separation tank and a reactivation tank. A loss of the energy source such as methane or propane discharged from the separation tank can be reduced. A water-treatment apparatus having a degradation tank and a separation tank, wherein a microorganism can be cultivated in the separation tank. The reactivation tank can be omitted, whereby the entire size of the apparatus can be reduced.

34 Claims, 5 Drawing Sheets

METHOD AND APPARATUS FOR TREATING WATER

BACKGROUND OF THE INVENTION

1. Field of the Invention

The present invention relates to a process and an apparatus for treating a water containing chlorinated organic compounds. Particularly, it relates to a treatment process and an apparatus for purifying groundwater, wastewater or the like containing aliphatic chlorinated organic compounds such as trichloroethylene, dichloroethylene, vinyl chloride, or aromatic chlorinated organic compounds such as chlorobenzene.

2. Description of Related Art

In recent years, there have been cases that aliphatic chlorinated organic compounds such as trichloroethylene, which are often used as cleaning agents in semiconductor factories or metal processing factories, leak from storage facilities or from wastewater, resulting contamination of soil and groundwater. Such leakage poses serious environmental problems. Contaminated groundwater has been conventionally treated mainly by pumping the contaminated groundwater, stripping the contaminant by air in an aeration column and then releasing it into the atmosphere or adsorbing it into activated carbon. If the contaminant is directly released into the atmosphere, treatment can be accomplished at low cost involving only aeration costs. However, this is an insufficient treatment process since it merely transfers the contaminant from water to the atmosphere thus giving rise to air pollution. If the contaminant is adsorbed into activated carbon, however, regeneration costs are incurred for regenerating spent activated carbon, and recovered chlorinated organic compounds must be disposed of. Wastewater containing chlorinated organic compounds have also been treated in the same manner or combined with other wastewater and treated by an activated sludge process or similar treatment process using an aerobic organism. However, problems also exist in these treatments since the compounds concerned are readily vaporizable with the result that they may be immediately diffused into the air by aeration.

Various techniques for biologically degrading such chlorinated organic compounds by biologically treating them with methanotrophs, phenol-degrading bacteria, toluene-degrading bacteria or the like have been proposed, but no practically feasible technique has yet been established. For example, a treatment technique using a bioreactor containing a methanotroph immobilized in gel has been proposed (JPB No. 67314/94). However, degrading bacteria which have once degraded chlorinated organic compounds such as trichloroethylene (TCE) rapidly decrease their trichloroethylene degradation activity, and many problems still remain for achieving a continuous and stable treatment on a practical level.

A bioreactor system for biodegrading trichloroethylene with a methanotroph has also been proposed (MIPR Nos. N91-84, N92-63: Herbes, S. E., Palumbo, A. V., Strong-Gunderson, J. L., Donaldson, T. L., Sayler, G. S., Bienkowski, P. R., Bowman, J. L., and Tschantz, M. F., "Innovative Bioreactor Development for Methanotrophic Biodegradation of Trichloroethylene", report number AL/EQ-TR-1994-0007, January 1994).

Figure 5:
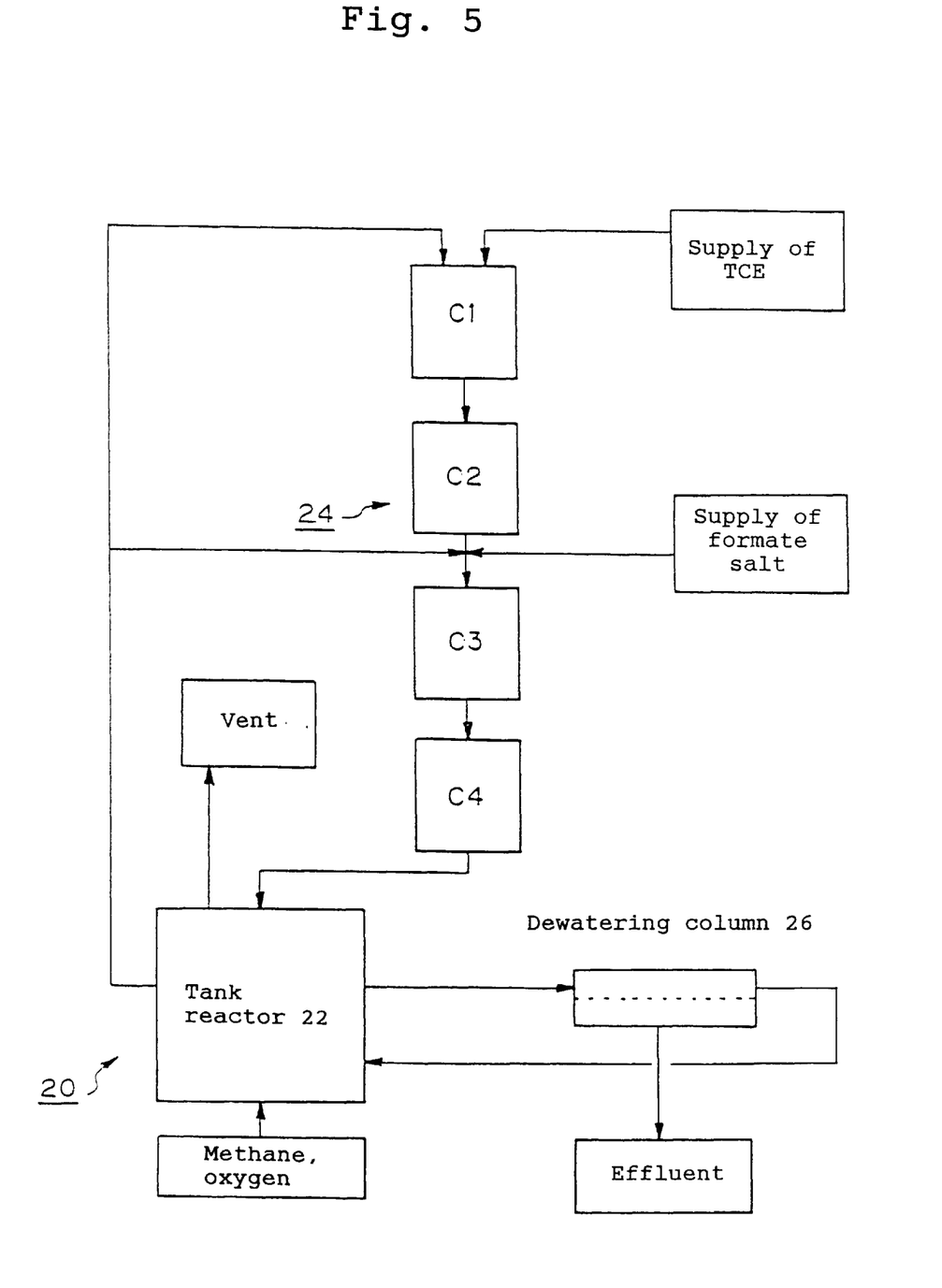
FIG. 5 shows a conventional bioreactor system.

As shown in FIG. 5, this bioreactor system 20 comprises a continuous stirred tank reactor 22, four plug-flow reactor columns 24 and a dewatering column 26. Methane and oxygen are supplied to the tank reactor 22 via a flow controller not shown and a methanotroph is cultivated in the tank reactor 22.

Then, a liquid containing the methanotroph is introduced into one of the reactor columns 24 from the tank reactor 22. This reactor column 24 is fed with trichloroethylene. In this reactor column 24, the methanotroph biodegrades trichloroethylene. A formate is supplied between the second and third stage reactor columns.

The liquid having passed through the reactor columns 24 is reintroduced into the tank reactor 22.

The liquid in the tank reactor 22 is introduced to the dewatering column 26. The dewatering column 26 contains a porous metal filter covered with a TEFLON® layer having a pore diameter of 0.22 µm. Wastewater having permeated the metal filter is discharged, while the retained methanotroph or the like is reintroduced into the tank reactor 22.

With this bioreactor system 20, however, a gas such as methane supplied to the tank reactor 22 is partially dissolved in the liquid and discharged with effluent through the dewatering column 26. Namely, it has the disadvantage that the gas supplied to the tank reactor 22 is partially wasted. Moreover, it was difficult to reduce the size of the system because the tank reactor 22 and the dewatering column 26 should be separately provided. SUMMARY OF THE INVENTION A first aspect of the present invention relates to a process for treating a water containing chlorinated organic compounds with a microorganism, wherein the microorganism is introduced from a degradation tank to a separation tank and an energy source is supplied to the microorganism separated in the separation tank to reduce the loss of energy source such as methane or propane discharged from the separation tank.

A second aspect of the present invention relates to an apparatus for treating a water containing organic compounds such as chlorinated organic compounds, which has a structure capable of continuously introducing water to be treated through a degradation tank, a separation tank and a reactivation tank. Thus, loss of an energy source such as methane or propane discharged from the separation tank can be reduced.

A third aspect of the present invention relates to an apparatus for treating a water containing organic compounds such as chlorinated organic compounds, wherein the microorganism can be cultivated in a separation tank so that the need for a reactivation tank is obviated and the overall size of the apparatus can be reduced. The apparatus of the present invention is not limited to use in the degradation of chlorinated organic compounds, but can also be used to degrade other organic compounds.

Accordingly, the first aspect of the present invention provides a process for treating a water containing chlorinated organic compounds, comprising the steps of treating a water containing chlorinated organic compounds with a microorganism capable of degrading chlorinated organic compounds in a degradation tank, introducing thus treated water to a separation tank, separating a composition containing said microorganism from said treated water in said separation tank to afford a clarified water substantially free from said microorganism, and then supplying an energy source for said microorganism.

Preferably, the step of supplying an energy source for said microorganism takes place in said separation tank. Preferably, the process comprises the step of introducing said microorganism in said separation tank to said degradation tank. Also preferably, the process comprises a circulation step for extracting an upper gas accumulating at the upper portion of said separation tank and introducing it into the lower portion of said separation tank, and said energy source is supplied in said circulation step.

On the other hand, the process preferably comprises the step of introducing said composition to a reactivation tank where said supplying step takes place. Also it preferably comprises the step of introducing said microorganism in said reactivation tank to said degradation tank.

Preferably, said microorganism is a methanotroph, a propane-oxidizing bacterium, a toluene-oxidizing bacterium, a phenol-oxidizing bacterium, an ammonia-oxidizing bacterium or a bacterium capable of degrading chlorinated aryls.

More preferably, said microorganism is a methanotroph. Preferably, a mixed gas containing methane and oxygen is supplied to said methanotroph in an aqueous solution in said supplying step, and the dissolved oxygen concentration in said aqueous solution is 20–400 $\mu$g/l. Namely, the dissolved oxygen concentration in the reactivation tank is preferably 20–400 $\mu$g/l when the methanotroph is cultivated in the reactivation tank, or the dissolved oxygen concentration in the separation tank is preferably 20–400 $\mu$g/l when the methanotroph is cultivated in the separation tank.

Preferably, a microorganism contained in enrichment cultures is used in said water-treating step. Preferably, said degradation tank has an inlet and an outlet, said water to be treated is introduced from said inlet of said degradation tank and the concentration of chlorinated organic compounds gradually decreases from said inlet to said outlet of said degradation tank.

The second aspect of the present invention provides an apparatus for treating a water containing organic compounds, comprising a degradation tank adapted to treat water containing organic compounds with a microorganism capable of degrading organic compounds, a separation tank adapted to separate a composition containing said microorganism from thus treated water to afford a clarified water substantially free from said microorganism, a reactivation tank adapted to activate or proliferate said microorganism, a feed line means connected to said reactivation tank and adapted to supply an energy source to said microorganism in said reactivation tank, a first line means for introducing said microorganism in said degradation tank to said separation tank, and a second line means for introducing said separated microorganism in said separation tank to said reactivation tank.

Preferably, the apparatus has a recycle line means for introducing the microorganism in said reactivation tank to said degradation tank. Said separation tank preferably has hollow fiber membranes or a filter therein. The apparatus preferably has a circulation line means for extracting an upper gas accumulating at the upper portion of said separation tank and introducing it into the lower portion of said separation tank. The apparatus preferably has a gas line adapted to introduce a gas into said circulation line means.

The third aspect of the present invention provides an apparatus for treating a water containing organic compounds, comprising a degradation tank adapted to treat water containing organic compounds with a microorganism capable of degrading organic compounds, a separation tank adapted to separate a composition containing said microorganism from thus treated water to afford a clarified water substantially free from said microorganism, a first line means for connecting said degradation tank to said separation tank, and a feed line means connected to said separation tank and adapted to supply an energy source to said microorganism in said separation tank.

Preferably, the apparatus has a circulation line adapted to extract an upper gas accumulating at the upper portion of said separation tank and introduce it into the lower portion of said separation tank in order to allow it to circulate, and said feed line means has a gas line means connected to said circulation line and adapted to introduce a gaseous energy source. Also, it preferably has a recycle line means for introducing said microorganism in said separation tank to said degradation tank.

Said separation tank preferably has hollow fiber membranes or a filter therein. Said degradation tank preferably has one vessel.

DETAILED DESCRIPTION OF THE INVENTION

The present invention will now be described in detail. "Chlorinated organic compounds" may be aliphatic or aromatic. Aliphatic chlorinated hydrocarbons can be degraded by methanotrophs, propane-oxidizing bacterium, toluene-oxidizing bacterium, ammonia-oxidizing bacteria or the like. For aromatic chlorinated hydrocarbons, microorganisms capable of degrading chlorinated aryls can preferably be used.

Aliphatic chlorinated organic compounds may be saturated or unsaturated. Aliphatic compounds preferably contain 1 to 6 carbon atoms, more preferably 1 to 3 carbon atoms. Specific examples include trichloroethylene, cis-1,2-dichloroethylene, trans-1,2-dichloroethylene, 1,1-dichloroethylene, 1,1,2,2-tetrachloroethane, 1,1,2-trichloroethane, 1,2-dichloroethane, chloroform, etc.

Aromatic chlorinated organic compounds may further have a substituent and include, for example, chlorobenzene, polychlorobiphenyl, etc.

"Methanotrophs" mean microorganisms that utilize methane as a carbon source, i.e. an energy source. Methanogens mean methane-producing bacteria and differs from methanotrophs.

"Methanotrophs" preferably produce soluble methane monooxygenase. Methane monooxygenase is an enzyme which mediates a metabolic reaction from methane and oxygen into methanol by using NADH as a reducing agent, and is broadly classified into soluble methane monooxygenase and particulate methane monooxygenase. Soluble methane monooxygenase is also responsible for the degradation reaction of aliphatic chlorinated organic compounds such as trichloroethylene. Frequently, methanotrophs oxidatively degrade aliphatic chlorinated organic compounds. During this oxidization process, methanotrophs generally consume but not gain energy.

Methanotrophs producing soluble methane monooxygenase include, for example, those belonging to the genera Methylosinus and Methylosporovibrio, specifically Methylosinus trichosporium, Methylosporovibrio methanica, etc.

For example, the Methylosinus trichosporium TSUKUBA (deposited with the National Institute of Bioscience and Human-Technology of the Agency of Industrial Science and Technology under accession number FERM P-10004) mentioned in JPB No. 67314/94 degrades trichloroethylene, cis-1,2-dichloroethylene, trans-1,2-dichloroethylene, 1,1-dichloroethylene, 1,1,2,2-tetrachloroethane, 1,1,2-trichloroethane, 1,2-dichloroethane, chloroform, etc.

"Propane-oxidizing bacteria" mean microorganisms that utilize propane as a carbon source to generally produce propane monooxygenase (Wackett L.P. et al., Application of Environmental Microbiology, 55, 2960–2964 (1988)). Namely, propane-oxidizing bacteria utilize propane as an energy source.

"Toluene-oxidizing bacteria" mean microorganisms that utilize toluene as a carbon source to generally produce toluene dioxygenase or toluene monooxygenase (Nelson M. J. K. et al., Application of Environmental Microbiology, 54, 604–606 (1988)). Namely, toluene-oxidizing bacteria utilize toluene as an energy source.

"Phenol-oxidizing bacteria" mean microorganisms that utilize phenol as a carbon source to generally produce toluene monooxygenase. Namely, phenol-oxidizing bacterium utilize phenol as an energy source.

"Ammonia-oxidizing bacteria" mean microorganisms that utilize the oxidization reaction of ammonia as an energy source to generally produce ammonia monooxygenase. An example thereof is Nitrosomonas europaea (Ariciero D., et al., Biochem. Biophys. Res. Commun. 159, 640–643 (1989)).

"Microorganisms capable of degrading chlorinated aryls" include those belonging to the genera Rhodotorula, Cladosporium, Candida and Saccharomyces (JPA Nos. 98085/74, 98086/73 and 6186/74). These microorganisms degrade chlorinated aryls such as polychlorobiphenyl. Methanotrophs also degrade chlorinated aryls such as m-chlorotoluene (JPA No. 127196/80).

These microorganisms may be supplied to a degradation tank as enrichment cultures.

Enrichment cultures of a methanotroph can be obtained in the following manner. At first, soil, groundwater or the like contaminated with chlorinated organic compounds is loaded on a culture medium suitable for cultivating the methanotroph. In order to preferentially produce soluble methane monooxygenase, the culture medium is preferably free from copper. Said soil, groundwater or the like is preferably treated by a process and an apparatus of the present invention. The loading amount is preferably 1/100 the volume of the culture medium.

This culture medium is fed with a mixed gas of methane gas and air for incubation. For example, the ratio of 5 parts of air to 1 part of a methane gas. The pH is preferably kept around 6–8, and the temperature is preferably 15–35° C., more preferably 25–35° C. Preferably, incubation is continued to reach a density of 1 g of dry cells per liter of the culture medium. Generally, incubation is continued for one week or more, for example 2–3 weeks.

For microorganisms other than methanotrophs, a sample such as soil or groundwater may be appropriately incubated under suitable conditions to cultivate the microorganism used.

The present invention relates to processes and apparatuses for treating a water containing chlorinated organic compounds such as trichloroethylene (TCE), dichloroethylene (DCE), and vinyl chloride. An apparatus of the present invention preferably comprises a wastewater inlet for transferring wastewater to a degradation tank for degrading chlorinated organic compounds with degrading bacteria, a separation tank for separating the degrading bacteria from the mixed liquid discharged from the degradation tank to afford a clarified water substantially free from the degrading bacteria, a reactivation tank for cultivating the degrading bacteria separated in the separation tank, and a bacteria feed line for transferring the degrading bacteria cultivated in the reactivation tank back to the degradation tank. The reactivation tank has a purpose of proliferating the degrading bacteria or improving the degrading capacity of the degrading bacteria.

A methanotroph is taken as an example in the following description, though various microorganisms can be used in processes and apparatus of the present invention.

Figure 1:
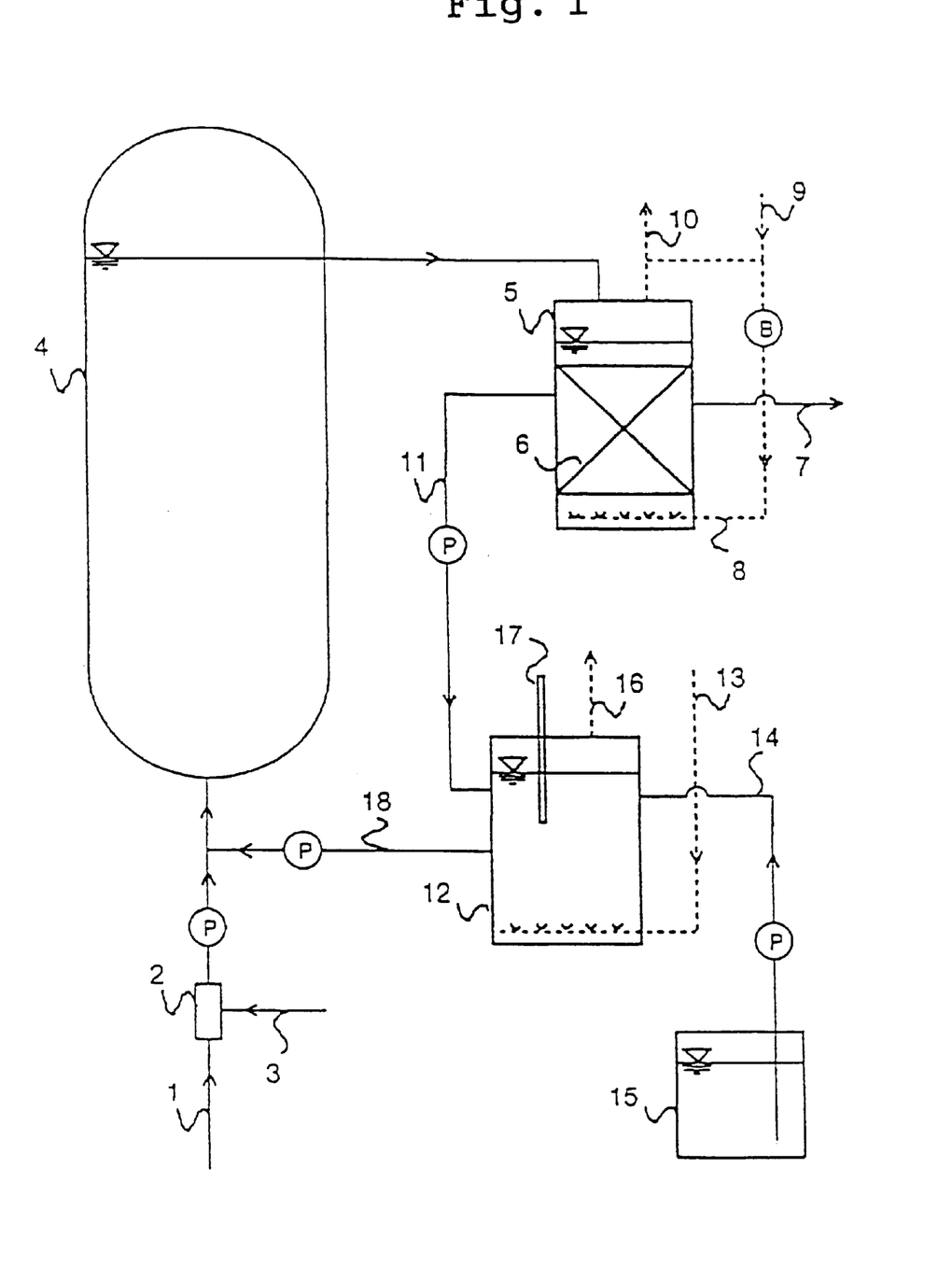
FIG. 1 shows an apparatus according to one embodiment of the present invention.

FIG. 1 shows an apparatus according to the second aspect of the present invention.

In a degradation tank 4, chlorinated organic compounds in water are degraded by a microorganism capable of degrading chlorinated organic compounds. In the degradation tank, the degradation reaction takes place preferably in a plug-flow manner. A plug-flow treatment process allows to degrade chlorinated organic compounds to a lower concentration than a mixing process, because biodegradation rate is generally proportional to the concentration of chlorinated organic compounds. For example, methanotrophs can degrade trichloroethylene to a sufficiently low concentration to meet water quality standards for potable water.

The degradation tank preferably has a cylindrical shape to allow the plug-flow by introducing an influent containing wastewater and degrading bacteria from an inlet of the cylindrical reaction tank and flowing the mixed liquid to the opposite outlet.

A sufficient amount of oxygen is required for a methanotroph to degrade chlorinated organic compounds. However, the plug-flow would be interrupted if an oxygen gas was spattered into the degradation tank. Therefore, the wastewater intake line preferably has a line mixer for introducing a gas containing oxygen such as air. Thus, the oxygen concentration in wastewater can be raised. In the degradation tank, oxygen is generally less consumed by degradation of chlorinated organic compounds but mostly consumed by respiration of the degrading bacteria. The oxygen concentration at the outlet of the degradation tank should preferably be maintained at least on the order of 1–2 mg/L, since degradation potency is lowered when the oxygen concentration falls to zero.

When a lateral degradation tank is used, the closed tank can be partitioned into a plurality of stages which the liquid passes through. A stirrer may be provided in each stage to mix the liquid, thereby achieving a plug-flow reaction.

The retention time in the degradation tank depends on the concentrations of chlorinated organic compounds in the influent and the chlorinated organic compound-degradation activity of the degrading bacteria. According to the present invention, the chlorinated organic compound-degradation activity of the degrading bacteria can be constantly kept at such a high value as 10 (L/g·hr) or more as expressed in a first-order reaction constant ($k_1$). Under such conditions, water containing chlorinated organic compounds at a concentration of a few ppb can be obtained by retaining a water containing chlorinated organic compounds at a concentration of about 10 mg/L in the degradation tank for about 3 hours.

Wastewater and degrading bacteria may be mixed at an introduction portion of a degradation tank where separate lines for feeding the wastewater and the degrading bacteria are connected to. Alternatively, a line for feeding degrading bacteria may be directly connected to a wastewater intake line, which is then connected to a degradation tank. The latter structure is preferred because the activity of the degrading bacteria can be stably maintained.

The mixed liquid discharged from the degradation tank is introduced to a separation tank for separating the degrading bacteria from a clarified water substantially free from the degrading bacteria. The degrading bacteria is recycled in the degradation tank, while the clarified water is discharged from the system.

The separation tank preferably has a module for membrane separation, filter or the like therein, and the separating membrane may be hollow fiber membranes, a flat-sheet membrane, a tubular membrane, etc. The separation tank preferably has a module of hollow fiber membranes.

With a module of hollow fiber membranes, a liquid may be passed from an outside to an inside of the hollow fiber membrane, and an inner permeate substantially clarified of the degrading bacteria may be separated from an outer concentrate containing the concentrated degrading bacteria.

Clarified water substantially free from the degrading bacteria can be obtained by aspirating the inner permeates by a pump or a pressure head. However, aspiration may sometimes cause the degrading bacteria to adhere to or press against surfaces of the membranes, thereby hindering filtration. To prevent this, the module of hollow fiber membranes are preferably vibrated by aeration with a gas.

According to the second aspect of the present invention, the separation tank has an object of separating the degrading bacteria from a clarified water substantially free from the degrading bacteria, and the degrading bacteria may not necessarily be cultivated in the separation tank. According to the second aspect of the present invention, the dissolved oxygen concentration in the separation tank may be equal to or lower than the dissolved oxygen concentration in the reactivation tank. The separation tank is preferably maintained under anaerobic conditions to keep the activity of the degrading bacteria. The separation tank can be maintained under anaerobic conditions by providing the separation tank as a sealed vessel which is aerated again with a gas accumulating at the upper portion via a circulation line while supplying an inert gas such as nitrogen gas to the gas circulation line. In this case, pressure control takes place by releasing a part of the supplied gas from the upper portion of the separation tank or the gas circulation line to the outside of the system. The retention time of liquid in the separation tank is, for example, about 30 minutes.

Also according to the second aspect of the present invention, the degrading bacteria is separated from a clarified water in the separation tank, and the microorganism is cultivated in the reactivation tank. A line for introducing the bacterium separated in the separation tank is connected to the reactivation tank. At the lower portion of the reactivation tank are provided a line for supplying a gas containing methane and oxygen and a line for supplying nutrient sources required for the enhancement of degradation activity or proliferation of the bacterium such as nitrogen, phosphorus, trace metals.

When a methanotroph is used, whether it is to be activated or proliferated is a matter of choice depending on the purpose of use, running cost, etc. If it is to be activated, a nutrient source containing a copper concentration of less than 0.004 mg/L and an iron concentration of 0.1 mg/L or more may be supplied to the separation tank in addition to a nutrient source such as nitrogen or phosphorus, as described in Japanese Patent Application No. 60042/95. If it is to be proliferated, a nutrient source containing a copper concentration of 0.0016 mg/L or more and an iron concentration of 0.1 mg/L or more may be supplied, as described in JPA No. 245760/94.

Nitrogen sources include, for example, ammonium chloride, sodium nitrate, etc. Phosphorus sources include potassium hydrogenphosphate, potassium dihydrogenphosphate, etc. Trace metals include those contained in culture media commonly used for the cultivation of methanotrophs, such as iron, calcium salts, magnesium salts.

In order to save on running costs, the reactivation tank should preferably be sealed, whereby a gas accumulating at the upper portion is circulated and introduced from the lower portion of the reactivation tank while a mixed gas is supplied to the gas circulation line to balance the consumed methane and oxygen. In this case, the dissolved oxygen concentration in the reactivation tank should preferably be kept at 20–400 $\mu$g/L, more preferably 80–300 $\mu$g/L. Control of dissolved oxygen can be achieved by providing a control device which enters readings on a dissolved oxygen concentration meter placed in the reactivation tank into an outer controller to automatically control the feed of oxygen and methane. The water temperature in the reactivation tank should be kept at 25° C. or more to obtain a stable degradation activity.

According to the second aspect of the present invention, water to be treated can be introduced into a degradation tank, a separation tank and a reactivation tank in this order, and therefore, the energy source such as methane or propane can not be readily discharged from the separation tank.

According to the third aspect of the present invention, the separation tank has an object of separating the degrading bacteria from a clarified water substantially free from the degrading bacteria and of cultivating the degrading bacteria. In such case, a gas containing methane and oxygen is preferably supplied to the gas circulation line. For example, a mixed gas of methane and air may be supplied. In this case, the dissolved oxygen concentration in the separation tank may be kept at 20–400 $\mu$g/L, preferably 80–300 $\mu$g/L, in order to maintain a high and stable activity of the degrading bacteria.

In order to stably achieve the enhancement of degradation activity or proliferation of the bacterium in the separation tank, the retention time in this tank is preferably about 0.5 to 1.5 days. The water temperature should be kept at 25° C. or more to obtain a stable degradation activity. Then, the bacterium separated in the separation tank is sent back to the degradation tank for degradation of chlorinated organic compounds.

The copper concentration, iron concentration, nitrogen source and phosphorus source used in the third aspect of the present invention are as described for the second aspect of the present invention.

According to the third aspect of the present invention, the microorganism can be cultivated in the separation tank so that the reactivation tank can be omitted and the entire size of the apparatus can be reduced.

The following examples illustrate the present invention, but should not be construed as limiting the same.

EXAMPLES

Example 1

FIG. 1 shows an apparatus according to the second aspect of the present invention. In FIG. 1, numeral references represent the following elements. 1: wastewater inlet; 2: line mixer; 3: oxygen gas or air feed line; 4: degradation tank, 5: separation tank; 6: module for membrane separation; 7: clarified water extraction line; 8: gas circulation line; 9: nitrogen gas feed line; 10: line for discharging excessive gas from the separation tank; 11: line for extracting the degrading bacteria from the separation tank to the reactivation tank; 12: reactivation tank; 13: feed line for a mixed gas of methane and oxygen; 14: feed line for nutrient salts; 15: storage tank for nutrient salts; 16: exhaust gas line; 17: dissolved oxygen monitor; 18: feed line for supplying the degrading bacteria from the reactivation tank to the degradation tank.

About 35 g (dry weight) of a preliminarily mass cultured methanotroph, Methylosinus trichosporium TSUKUBA (deposited with the National Institute of Bioscience and Human-Technology of the Agency of Industrial Science and Technology under accession number FERM P-10004) was introduced into the separation tank 5 and the reactivation tank 12. Wastewater containing trichloroethylene was supplied from the wastewater inlet 1, and oxygen gas or air was dissolved into the wastewater via the line mixer 2. This wastewater was mixed with the degrading bacteria from the reactivation tank 12 just before the degradation tank 4, and the mixed wastewater was supplied to the degradation tank 4 at a rate of 4 ml/min. In the degradation tank 4, trichloroethylene was degraded by mildly flowing the mixed wastewater upward in a plug-flow manner at a rate enough to prevent solid-liquid separation between the degrading bacteria and wastewater, and then the mixed liquid was flown into the subsequent separation tank 5.

The separation tank 5 contains a module 6 for hollow fiber membranes having a membrane area of 0.4 m$^2$. A given amount of water having permeated this hollow fiber membrane, i.e. water substantially clarified of the degrading bacteria was pumped via a line for extracting clarified water 7. The separation tank 5 has a gas circulation line 8, through which nitrogen gas was circulated at a rate of 20 mL/min. from a nitrogen gas feed line 9 to aerate the inside of the separation tank 5 under anaerobic conditions. Concentrated water containing the degrading bacteria concentrated in the separation tank 5 was sent to the reactivation tank 12. In the separation tank 5, concentrated water is preferably placed under anaerobic conditions.

The reactivation tank 12 was fed with a gas containing methane and oxygen via a line for feeding a mixed gas containing methane and oxygen 13. The reactivation tank 12 was also fed with appropriate amounts of nutrient salts via a line for feeding nutrient salts 14 from a tank 15 storing nutrient salts such as trace metals, nitrogen, phosphorus, etc. A monitor for measuring dissolved oxygen concentration within the reactivation tank 12 was placed to regulate the flow rate of the mixed gas containing methane and oxygen at an appropriate dissolved oxygen concentration. Specifically, a mixed gas of methane and air in a ratio of 20:80 was used. The retention time in the reactivation tank was about one day.

The degrading bacteria was extracted from the reactivation tank 12 at a rate of about 1 mL/min. and continuously supplied to the degradation tank 4 via a feed line for the degrading bacteria 18.

Trichloroethylene degradation activity of the methanotroph and its dependency on dissolved oxygen concentration were tested. The dissolved oxygen concentration in the reactivation tank was varied to 20–80 $\mu$g/L, 300 $\mu$g/L, 500 $\mu$g/L and 400 $\mu$g/L in this order. The trichloroethylene level in influent supplied to the degradation tank was measured and increased stepwise. Influent at the inlet of the degradation tank 4 and the mixed liquid at the outlet of the degradation tank 4 were sampled, and the trichloroethylene degradation activity of the degrading bacteria was appropriately measured in a vial.

Figure 2:
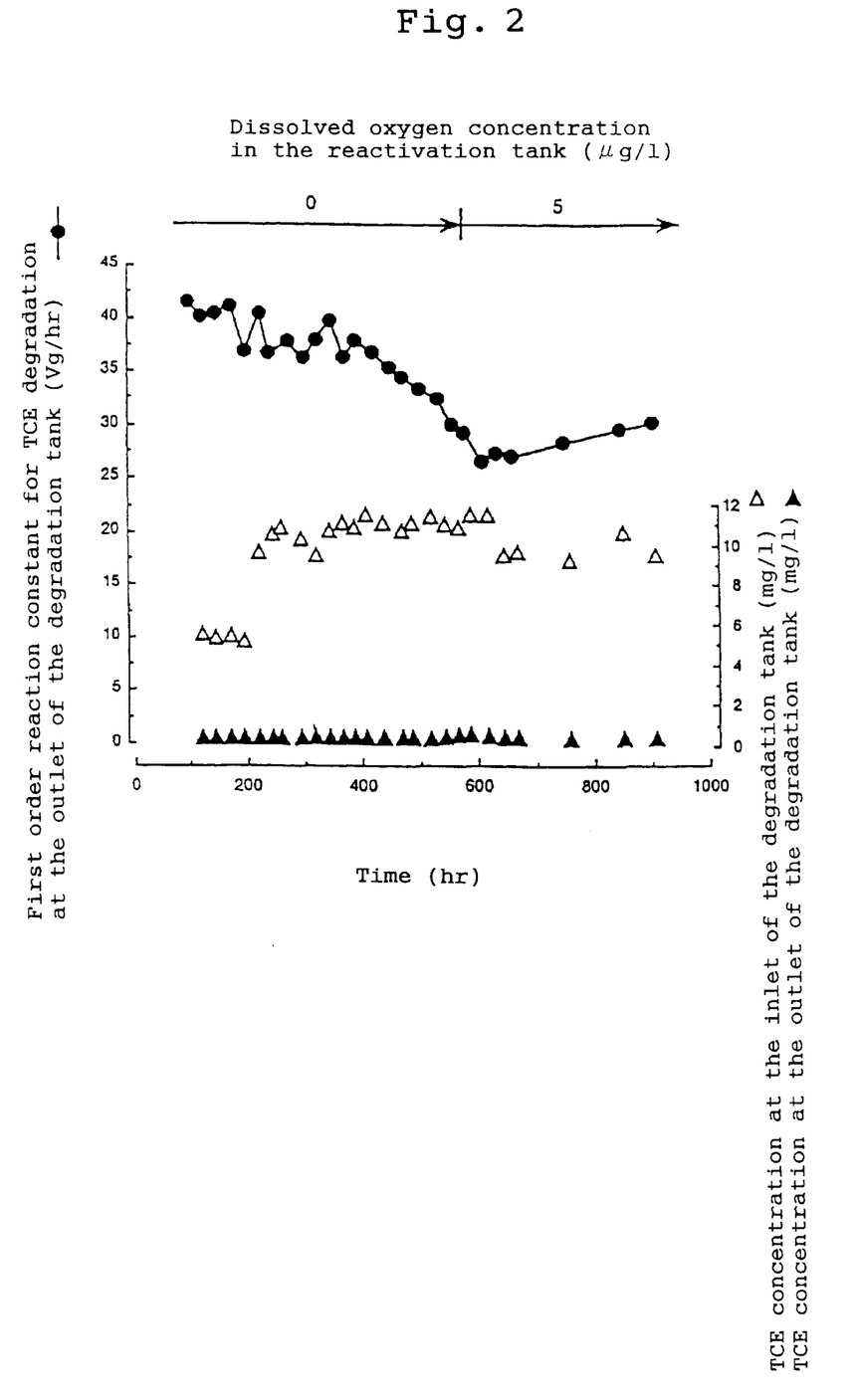
FIG. 2 is a graph showing results of treatment performance in the apparatus as shown in FIG. 1.

The experimental results are shown in FIG. 2. The first order reaction constant for TCE degradation at the outlet of the degradation tank 4 is plotted on the ordinate. This first order reaction constant for TCE degradation is a parameter of trichloroethylene degradation activity, i.e. the higher the first order constant, the higher the degradation activity, while the lower the first order constant, the lower the degradation activity.

FIG. 2 shows that wastewater having a trichloroethylene concentration of 0.03 mg/L or less could be stably obtained under the condition of trichloroethylene concentration of 4 mg/L in influent at the inlet of the degradation tank 4. When the TCE concentration in influent was raised to 10 mg/L, however, the first order constant for trichloroethylene degradation at the outlet of the degradation tank 4 gradually fell and the trichloroethylene concentration in the treated water exceeded 0.05 mg/L.

When the dissolved oxygen concentration in the reactivation tank 12 was raised from 20–80 $\mu$g/L to 300 $\mu$g/L at that instant, however, the first order constant for trichloroethylene degradation at the outlet of the degradation tank 4 rapidly recovered and the trichloroethylene concentration in the treated water was also constant at 0.03 mg/L or less. When the dissolved oxygen concentration in this tank was further raised to 500 $\mu$g/L, the first order constant for TCE degradation at the outlet of the degradation tank 4 fell again and the trichloroethylene concentration in the treated water tended to increase. When the dissolved oxygen concentration was lowered to 400 $\mu$g/L, the first order constant for trichloroethylene degradation at the outlet of the degradation tank recovered. These results show that the dissolved oxygen concentration in the reactivation tank 12 significantly influences trichloroethylene degradation activity of the degrading bacteria. It was also found that even influent having a trichloroethylene concentration of 10 mg/L can be stably treated.

Example 2

Figure 3:
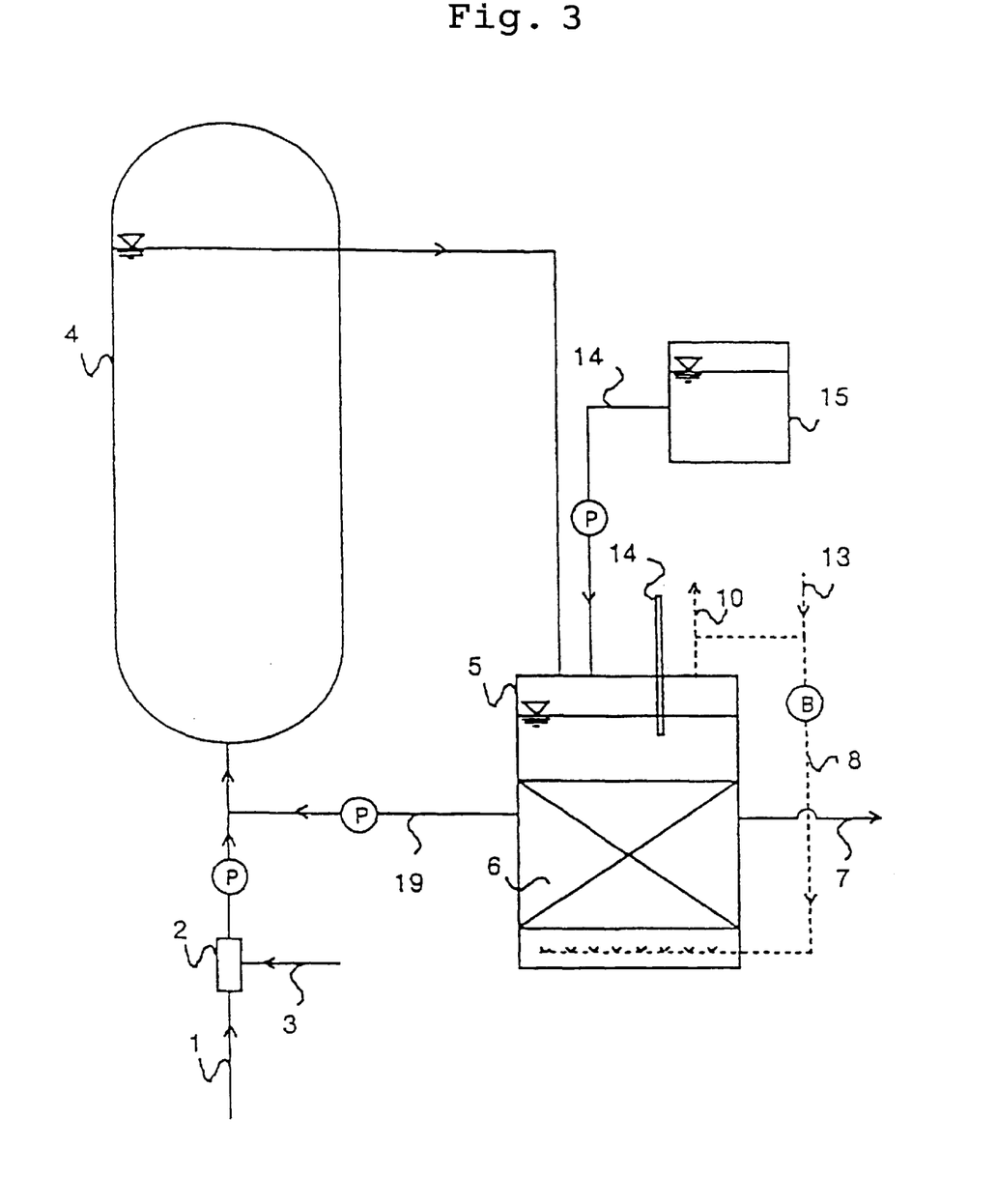
FIG. 3 shows an apparatus according to another embodiment of the present invention.

FIG. 3 shows an apparatus according to the third aspect of the present invention. The apparatus shown in FIG. 3 differs from the apparatus shown in FIG. 1 in that the reactivation tank 12 is not provided and the separation tank 5 also serves as a reactivation tank. Accordingly, a feed line 13 for a mixed gas containing methane and oxygen and a tank 15 for storing nutrient salts are connected to the separation tank 5 via a gas circulation line 8 and a feed line 14 for nutrient salts, respectively.

Using the apparatus shown in FIG. 3, experiments were done on wastewater containing cis-dichloroethylene (cDCE). A mixed gas containing methane and air in a ratio of 20:80 was used.

In FIG. 3, numeral references represent the following elements. 1: wastewater inlet; 2: line mixer; 3: oxygen gas /air feed line; 4: degradation tank, 5: separation tank; 6: module for membrane separation; 7: treated water extraction line; 8: gas circulation line; 10: line for discharging excessive gas from the separation tank; 13: feed line for a mixed gas of methane and oxygen; 14: feed line for nutrient salts; 15: storage tank for nutrient salts; 17: dissolved oxygen monitor; 19: feed line for supplying the degrading bacteria from the separation tank to the degradation tank. This example was run under the condition of dissolved oxygen concentration of 300 µg/L, using enrichment cultures preliminarily collected from trichloroethylene-contaminated soil as a methanotroph. At the start, the enrichment cultures were added into the degradation tank at a cell density of 1500 mg/L on the basis of dry weight. Other operation conditions were essentially similar to those used in Example 1.

Figure 4:
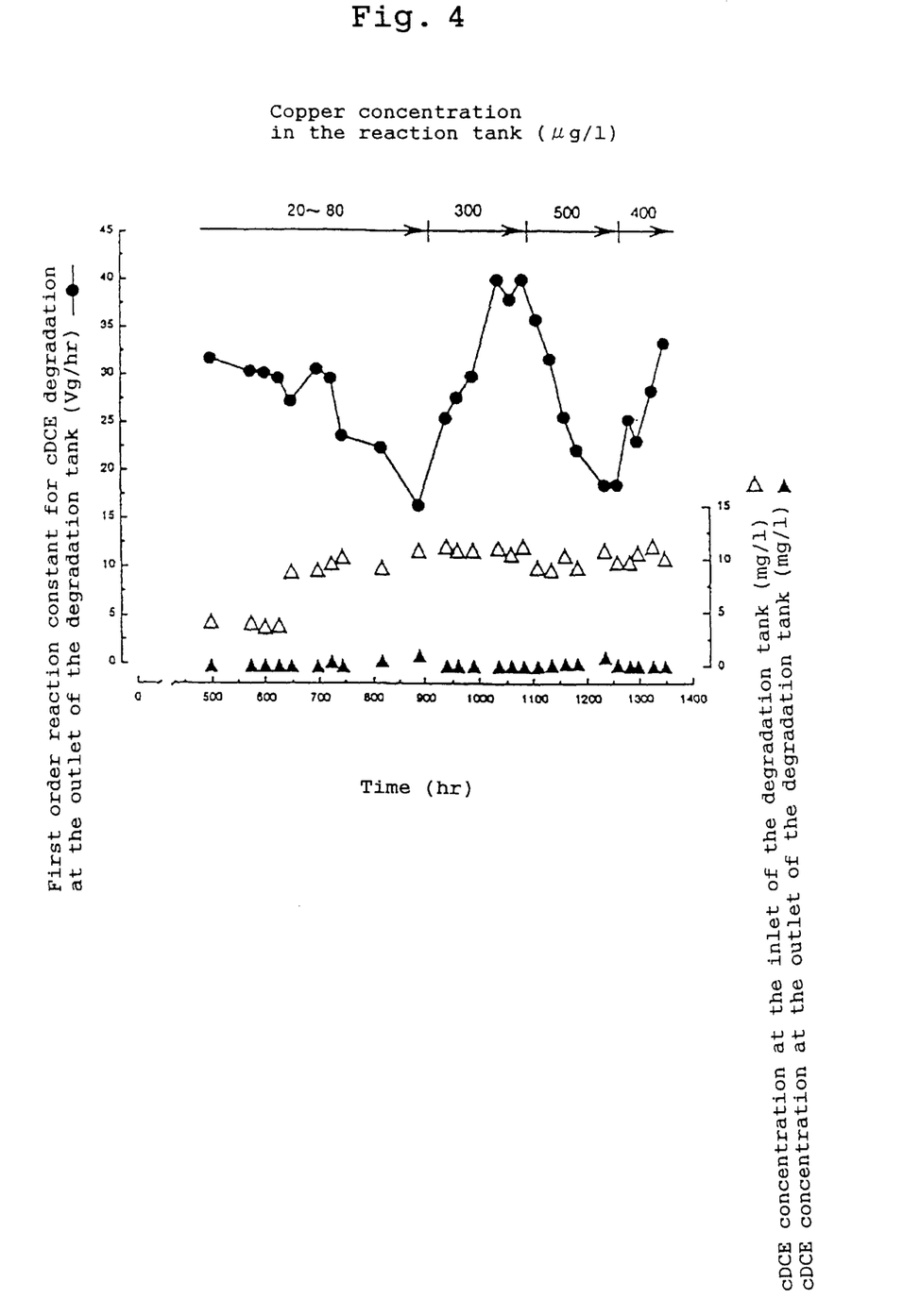
FIG. 4 is a graph showing results of treatment performance in the apparatus as shown in FIG. 3.

The experimental results are shown in FIG. 4, which proves that the cDCE concentration in the treated water was constant at 0.04 mg/L or less under the condition of cDCE concentration in influent of 5 mg/L.

When the cDCE concentration in influent was raised to 10 mg/L, the first order constant for cDCE degradation at the outlet of the degradation tank gradually fell and the cDCE concentration in the treated water reached 0.1 mg/L or more. When the copper concentration in the separation tank 5 was raised from 0 µg/L to 5 µg/L at that instant, however, the first order constant for cDCE degradation at the outlet of the degradation tank 4 slightly increased and the cDCE concentration in the treated water became gradually improved and then stabilized at 0.04 mg/L or less.

When the copper concentration was 0 mg/L, the cell density in the degradation tank 4 essentially remained at the initial value to show a balance between the sampled amount and proliferated amount. However, the cell density in the degradation tank 4 gradually increased after addition of copper, and reached 2000 mg/L on day 10 after addition. Since the degradation rate of cDCE per cell was unchanged, the proliferation of the methanotroph enhanced by addition of copper seemed to maintain a high cell density in the degradation tank and improve the cDCE concentration in the treated water. Contrary to the conventional knowledge that an increased copper concentration lowers the activity of enzymes responsible for methanotrophic degradation of chlorinated organic compounds, a sufficient degradation could be achieved by a good balance with the degradation activity of the newly proliferated degrading bacteria at the concentration concentration of this experiment.

Although not shown in the figure, the influence of iron was also examined in a similar experimental system. The result showed sudden deterioration of the quality of the treated water at insufficient iron concentrations of less than 0.1 mg/L, i.e. the cell density and the first order constant for CDCE degradation at the outlet of the degradation tank decreased at the same time.

This proved that even influent having a cDCE concentration of 10 mg/L can be stably treated by properly balancing the proliferation of the degrading bacteria with the degradation activity decreased by degradation of chlorinated organic compounds.

Example 3

Experiments were carried out using varying ratios between the concentration of the degrading bacteria and the concentration of chlorinated organic compounds at the inlet of the degradation tank, because such a ratio is important for stably maintaining the degradation activity of the degrading bacteria in the degradation tank.

Using the apparatus shown in FIG. 1, the mixed liquid was sampled at the inlet and outlet of the degradation tank and the degrading bacteria was separated from the mixed liquid to evaluate TCE degradation activity of the degrading bacteria in a vial. In run Nos. 1–8, the concentration of the degrading bacteria supplied from the reactivation tank and the concentration of trichloroethylene in influent wastewater were varied. The concentration of the degrading bacteria was varied by changing the amount of the bacterium supplied from the reactivation tank while the flow rate of influent into the degradation tank was kept constant. In any run, the dissolved oxygen concentration in the reactivation tank was maintained at about 200 µg/L while other conditions were unchanged. Each run was continued for 4 days, and the first order constant for trichloroethylene degradation was tested in the mixed liquid on day 4.

The results are shown in Table 1, wherein $k_1$ represents first order constant for trichloroethylene degradation per unit bacterium (L/g·hr).

TABLE 1

| Run No. | Bacterial concentration during contact (M)mg/L | TEC concentration during contact (F)mg/L | F/M ratio | $k_1$ at inlet of degradation tank | $k_1$ at outlet of degradation tank | $\Delta k_1$ |
|---|---|---|---|---|---|---|
| 1 | 1250 | 1.0 | 0.0008 | 34 | 33 | 1 |
| 2 | 1250 | 4.0 | 0.003 | 35 | 32 | 3 |
| 3 | 1250 | 10 | 0.008 | 34 | 29 | 5 |
| 4 | 1250 | 15 | 0.012 | 33 | 20 | 13 |
| 5 | 2020 | 10 | 0.005 | 30 | 27 | 3 |
| 6 | 2020 | 15 | 0.0074 | 33 | 30 | 3 |
| 7 | 800 | 8.0 | 0.01 | 35 | 31 | 4 |
| 8 | 800 | 12 | 0.015 | 36 | 18 | 18 |

When the ratio between the bacterial concentration and trichloroethylene concentration at the inlet of the degradation tank is 0.01 or less, the difference between $k_1$ at the inlet and $k_1$ at the outlet of the degradation tank is 5 (L/g·hr) or less. When said ratio is 0.012 or more, however, the $k_1$ difference is 13 (L/g·hr) or more, indicating that the trichloroethylene degradation activity per unit bacterium significantly decreases. Therefore, the F/M ratio between the concentration of chlorinated organic compounds contained in influent wastewater and the concentration of the degrading bacteria during contact should preferably be kept at 0.01 or less in order to stably maintain the degradation activity.

As has been described, the present invention remarkably improved the performance of processes and apparatuses for biologically degrading chlorinated organic compounds. Thus, even wastewater containing chlorinated organic compounds at a concentration of 10 mg/L can be stably treated to a low concentration of chlorinated organic compounds by constantly maintaining the degradation activity.

According to the first and second aspects of the present invention, water to be treated can be introduced into a degradation tank, a separation tank and a reactivation tank in this order, and therefore, the energy source such as methane or propane can not be readily discharged from the separation tank. According to the third aspect of the present invention, the microorganism can be cultivated in the separation tank so that the reactivation tank can be omitted, and the entire size of the apparatus can be reduced.

What is claimed is:
1. A process for treating water containing a chlorinated organic comprising the steps of:
   treating water containing a chlorinated organic compound with a microorganism capable of degrading a chlorinated organic compound in a degradation tank;
   introducing thus treated water to a separation tank;
   separating a composition containing said microorganism from said treated water in said separation tank to afford a clarified water substantially free from said microorganism; and supplying an energy source for said microorganism,
wherein the step of supplying an energy source for said microorganism takes place in said separation tank.

2. The process of claim 1, further comprising the step of introducing said microorganism in said separation tank to said degradation tank.

3. The process of claim 1, further comprising a circulation step for extracting an upper gas accumulating at an upper portion of said separation tank and introducing the upper gas into the lower portion of said separation tank, wherein said energy source is supplied in said circulation step.

4. The process of claim 1, further comprising the step of introducing said composition to a reactivation tank, wherein said supplying step takes place in said reactivation tank.

5. The process of claim 4, further comprising the step of introducing said microorganism in said reactivation tank to said degradation tank.

6. The process of claim 1, wherein said microorganism comprises a methanotroph, a propane-oxidizing bacterium, a toluene-oxidizing bacterium, a phenol-oxidizing bacterium, an ammonia-oxidizing bacterium and a bacterium capable of degrading chlorinated aryls.

7. The process of claim 1, wherein said microorganism comprises a methanotroph.

8. The process of claim 7, wherein a mixed gas containing methane and oxygen is supplied to said methanotroph in an aqueous solution in said supplying step and the dissolved oxygen concentration in said aqueous solution is 20–400 $\mu$g/l.

9. The process of claim 1, wherein a microorganism contained in enrichment cultures is used in said water-treating step.

10. The process of claim 1, wherein said degradation tank has an inlet and an outlet, said water to be treated is introduced from said inlet of said degradation tank, and the concentration of chlorinated organic compounds gradually decreases from said inlet to said outlet of said degradation tank.

11. An apparatus for treating water containing an organic compound, comprising:
    a degradation tank adapted to treat water containing an organic compound with a microorganism capable of degrading an organic compound;
    a separation tank adapted to separate a composition containing said microorganism from thus treated water to afford a clarified water substantially free from said microorganism;
    a reactivation tank adapted to activate or proliferate said microorganism;
    a feed line connected to said reactivation tank and adapted to supply an energy source to said microorganism in said reactivation tank;
    a first line connecting said degradation tank to said separation tank;
    a second line connecting said separation tank to said reactivation tank; and
    a circulation line for extracting an upper gas accumulating at an upper portion of said separation tank and introducing the upper gas into the lower portion of said separation tank.

12. The apparatus of claim 11, further comprising a recycle line connecting said reactivation tank to said degradation tank.

13. The apparatus of claim 11, wherein said separation tank has hollow fiber membranes or a filter therein.

14. The apparatus of claim 11, further comprising a gas line adapted to introduce a gas into said circulation line.

15. An apparatus for treating water containing an organic compound, comprising:
    a degradation tank adapted to treat water containing an organic compound with a microorganism capable of degrading an organic compound;
    a separation tank adapted to separate a composition containing said microorganism from thus treated water to afford a clarified water substantially free from said microorganism;
    a first line connecting said degradation tank to said separation tank;
    a feed line connected to said separation tank and adapted to supply an energy source to said microorganism in said separation tank; and
    a circulation line adapted to extract an upper gas accumulating at an upper portion of said separation tank and introducing the upper gas into the lower portion of said separation tank to allow circulation.

16. The apparatus of claim 15, wherein said feed line has a gas line connected to said circulation line and adapted to introduce a gaseous energy source.

17. The apparatus of claim 15, further comprising a recycle line connecting said separation tank to said degradation tank.

18. The apparatus of claim 15, wherein said separation tank has hollow fiber membranes or a filter therein.

19. The apparatus of claim 15, wherein said degradation tank has one vessel.

20. An apparatus for treating water containing an organic compound, comprising:
    a degradation tank adapted to treat water containing an organic compound with a microorganism capable of degrading an organic compounds;
    a separation tank adapted to separate a composition containing said microorganism from thus treated water to afford a clarified water substantially free from said microorganism;
    a reactivation tank adapted to activate or proliferate said microorganism;
    a feed line connected to said reactivation tank and adapted to supply an energy source to said microorganism in said reactivation tank;
    a first line connecting said degradation tank to said separation tank;
    a second line connecting said separation tank to said reactivation tank; and
    a circulation line for extracting an upper gas accumulating at an upper portion of said reactivation tank and introducing the upper gas into the lower portion of said reactivation tank.

21. The process of claim 20, wherein said separation tank has hollow fiber membranes or a filter therein.

22. The process of claim 20, wherein said feed line is connected to said circulation line.

23. An apparatus for treating water containing an organic compound, comprising:
    a degradation tank adapted to treat water containing an organic compound with a microorganism capable of degrading an organic compound;
    a separation tank adapted to separate a composition containing said microorganism from thus treated water to afford a clarified water substantially free from said microorganism;
    a first line connecting said degradation tank to said separation tank; and a feed line connected to said separation tank and adapted to supply an energy source to said microorganism in said separation tank;

wherein said separation tank has hollow fiber membranes or a filter therein.

24. A process for treating water containing a chlorinated organic compound, comprising the steps of:

treating water containing a chlorinated organic compound with a microorganism capable of degrading a chlorinated organic compound in a degradation tank;

introducing thus treated water to a separation tank;

separating a composition containing said microorganism from said treated water in said separation tank to afford a clarified water substantially free from said microorganism;

supplying an energy source for said microorganism to said separation tank; and introducing said microorganism in said separation tank to said degradation tank.

25. A process for treating water containing a chlorinated organic compound, comprising the steps of:

treating water containing a chlorinated organic compound with a microorganism capable of degrading a chlorinated organic compound in a degradation tank;

introducing thus treated water to a separation tank;

separating a composition containing said microorganism from said treated water in said separation tank to afford a clarified water substantially free from said microorganism;

supplying an energy source for said microorganism; and a circulation step of extracting an upper gas accumulating at an upper portion of said separation tank and introducing the upper gas into the lower portion of said separation tank, wherein said energy source is supplied in said circulation step.

26. A process for treating water containing a chlorinated organic compound, comprising the steps of:

treating water containing a chlorinated organic compound with a microorganism capable of degrading a chlorinated organic compounds in a degradation tank;

introducing thus treated water to a separation tank;

separating a composition containing said microorganism from said treated water in said separation tank to afford a clarified water substantially free from said microorganism;

introducing said composition to a reactivation tank; and supplying an energy source for said microorganism to said reactivation tank.

27. The process of claim 26, wherein said microorganism is a methanotroph, a propane-oxidizing bacterium, a toluene-oxidizing bacterium, a phenol-oxidizing bacterium, an ammonia-oxidizing bacterium or a bacterium capable of degrading chlorinated aryls.

28. The process of claim 26, wherein said microorganism comprises a methanotroph.

29. The process of claim 28, wherein a mixed gas containing methane and oxygen is supplied to said methanotroph in an aqueous solution in said supplying step and the dissolved oxygen level in said aqueous solution is 20–400 $\mu g/l$.

30. The process of claim 26, wherein a microorganism contained in enrichment cultures is used in said water-treating step.

31. The process of claim 26, wherein said degradation tank has an inlet and an outlet, said water to be treated is introduced from said inlet of said degradation tank, and the concentration of chlorinated organic compounds gradually decreases from said inlet to said outlet of said degradation tank.

32. The process of claim 26, further comprising a circulating step for extracting an upper gas accumulating at an upper portion of said reactivation tank and introducing the upper gas into the lower portion of said reactivation tank.

33. The process of claim 32, wherein said energy source is supplied in said circulation step.

34. The process of claim 26, wherein the energy source contains a carbon source.

* * * * *